(12) United States Patent
Kindler et al.

(10) Patent No.: US 9,572,453 B2
(45) Date of Patent: Feb. 21, 2017

(54) DEVICE FOR DISCHARGING AND HEATING MILK

(71) Applicant: FRANKE Kaffeemaschine AG, Aarburg (CH)

(72) Inventors: Heinrich Kindler, Wolflinswil (CH); Heinz Oberholzer, Kungoldingen (CH); Heinz Vetterli, Wangen (CH)

(73) Assignee: FRANKE Kaffeemaschinen AG, Aarbug (CH)

( * ) Notice: Subject to any disclaimer, the term of this patent is extended or adjusted under 35 U.S.C. 154(b) by 27 days.

(21) Appl. No.: 14/293,412

(22) Filed: Jun. 2, 2014

(65) Prior Publication Data
US 2014/0272051 A1  Sep. 18, 2014

Related U.S. Application Data

(63) Continuation of application No. 13/656,944, filed on Oct. 22, 2012, now Pat. No. 8,795,752.

(30) Foreign Application Priority Data

Oct. 20, 2011 (DE) .................. 10 2011 084 901

(51) Int. Cl.
*A47J 31/44* (2006.01)
*A23C 9/00* (2006.01)

(52) U.S. Cl.
CPC .............. *A47J 31/4485* (2013.01); *A23C 9/00* (2013.01)

(58) Field of Classification Search
CPC ....... A47J 31/005; A47J 31/4485; A23C 9/00; A23C 3/037
See application file for complete search history.

(56) References Cited

U.S. PATENT DOCUMENTS

| | | | |
|---|---|---|---|
| 3,101,041 A | 8/1963 | Hallstrom | |
| 5,357,848 A | 10/1994 | Eugster et al. | |
| 5,544,571 A * | 8/1996 | Nahra | A23C 3/0375 261/116 |
| 6,019,032 A | 2/2000 | Arksey | |
| 6,099,878 A | 8/2000 | Arksey | |
| 6,713,110 B2 | 3/2004 | Imboden et al. | |
| 8,356,551 B2 | 1/2013 | Coccia et al. | |
| 8,657,262 B2 | 2/2014 | Burri et al. | |
| 2009/0011110 A1 | 1/2009 | Gotlenboth | |

(Continued)

FOREIGN PATENT DOCUMENTS

| | | |
|---|---|---|
| DE | 202009007945 | 10/2009 |
| DE | 102009041809 | 4/2011 |

(Continued)

*Primary Examiner* — Anthony Weier
(74) *Attorney, Agent, or Firm* — Volpe and Koenig, P.C.

(57) ABSTRACT

A device for discharging milk and/or milk froth, including a pump to convey milk from a container, a flow-heater, and an output for discharging milk, embodied cooperating with each other such that milk conveyed via the pump and heated via the flow-heater can be discharged from the output. At least one steam generator is provided cooperating with the flow-heater such that downstream in reference to the flow-heater and upstream in reference to the output, steam can be fed to the milk for an additional heating step. An air valve to create milk froth is provided, and the air valve is openable to introduce air upstream in reference to the flow-heater.

8 Claims, 2 Drawing Sheets

(56) References Cited

U.S. PATENT DOCUMENTS

| | | |
|---|---|---|
| 2009/0068331 A1 | 3/2009 | Muheim |
| 2010/0323074 A1 | 12/2010 | Fliegauf et al. |
| 2011/0083561 A1 | 4/2011 | Douma et al. |
| 2011/0232501 A1 | 9/2011 | Kroesen et al. |

FOREIGN PATENT DOCUMENTS

| | | |
|---|---|---|
| EP | 0635230 | 1/1995 |
| EP | 1747743 | 1/2007 |
| EP | 2294952 | 3/2011 |
| JP | 200966411 | 4/2009 |
| WO | 2011105943 | 9/2011 |

\* cited by examiner

DEVICE FOR DISCHARGING AND
HEATING MILK

INCORPORATION BY REFERENCE

The following documents are incorporated herein by reference as if fully set forth: U.S. patent application Ser. No. 13/656,944, filed Oct. 22, 2012; and German Patent Application No. 102011084901.7, filed Oct. 20, 2011.

BACKGROUND

The invention relates to a device for discharging milk as well as a method for heating milk.

Devices to discharge milk are known, which comprise a pump for conveying milk from a container, a flow-heater, and an output for discharging milk. Via the output the milk can be discharged into a container, for example a cup. Conveying milk via a pump and heating it in a flow-heater to discharge it in an output represents a simple and inexpensively designed method for discharging warm milk.

Such devices are particularly used in devices for generating liquid foods, particularly in automatic coffee makers, since here frequently mixed drinks are requested, which comprise for example warm milk and/or milk froth as one of its components.

Particularly in automatic coffee makers frequently devices as the ones described above are integrated or connected as an attachment of such coffee makers or at least connected to a joint output to discharge of milk, on the one side, and coffee, on the other side.

In particular when using a device for discharging warm milk in the food industry high requirements are set to hygiene and cleaning options. In particular, no milk residue may remain in the device over an extended period of time.

SUMMARY

The invention is therefore based on the objective of improving the device of the prior art for discharging milk and the method of the prior art for heating milk such that it allows additional optional applications and/or a simplified compliance with the stipulated hygienic conditions.

This objective is attained in a device to discharge milk, in a method to heat milk, and in a method for optionally creating warm milk or warm milk froth, which utilize one or more features of the invention.

The device according to the invention for discharging milk comprises a pump to convey milk from a container, a flow-heater, and an output for discharging milk, embodied cooperating with each other such that milk conveyed by the pump and heated by the flow-heater can be discharged from the output.

This basic structure is therefore similar to the one of devices of prior art, with the framework of the invention including to arrange the flow-heater at the suction and/or pressure side of the pump; preferably the flow-heater is arranged at the pressure side of the pump.

It is essential that the device according to the invention further comprises at least one steam generator, which steam generator is embodied cooperating with the flow-heater such that, downstream in reference to the flow-heater and upstream in reference to the output, steam can additionally be fed to the milk for heating purposes.

The invention is based on applicant's finding that although flow-heaters allow a simply designed option for heating milk and, particularly when electric heating is provided, a precise control of the temperature by regulating the electric power, however flow-heaters are disadvantageous in two essential aspects for heating milk.

In typical flow-heaters used to heat milk frequently a baking of milk or milk residue occurs inside the flow-heater. This leads to the necessity to perform expensive and frequent cleaning steps using cleaning agents.

Furthermore, using the flow-heaters of prior art milk cannot be heated to high temperatures, such as above 80° C. at high flow rates, for example.

In the devices of prior art frequently electric power was increased in order to yield higher flow rates and/or a desired high milk temperature. Experiments of the applicant have shown, however, that particularly at temperatures exceeding 70° C. increasing baking of milk occurs to a flow-heater.

The device according to the invention however uses a two-step heating process:

In a first heating process the milk is heated in the flow-heater and subsequently steam is supplied for additional heating in a second heating step.

Here, the essential above-mentioned disadvantages of using flow-heaters to heat milk can be avoided:

Due to the fact that it is not necessary for the milk to be heated to the desired target temperature in the flow-heater, on the one hand, any baking of the milk in the flow-heater can be avoided or at least reduced considerably and furthermore a considerably higher flow rate can be achieved in reference to devices of prior art.

Experiments of the applicant have shown that at a temperature as low as 70° C. and particularly at a temperature exceeding 80° C. the above-stated disadvantageous effects in the flow-heater occur.

Advantageously the device therefore comprises a control unit, which controls the pump and/or the flow heater such that the milk at the output of the flow-heater shows a temperature ranging from 50° C. to 85° C., preferably from 55° C. to 80° C., further preferred ranging from 60° C. to 70° C. This way, both a baking in the flow-heater is avoided and it is still possible to discharge hot milk at a high flow-rate, for example exhibiting a temperature exceeding 80° C., based on which additionally two heating steps can be achieved by adding steam.

In the method according to the invention for heating milk the milk is conveyed via a pump from a container, heated by a flow-heater, and discharged via an output. Here, too, it is within the scope of the invention that the milk, prior to passing the pump, is heated by the flow-heater or after passing the pump, with the latter representing a preferred embodiment.

It is essential that in the method according to the invention the milk, after being heated by the flow-heater, is additionally heated by steam being fed thereto.

The method according to the invention is preferably embodied to be performed via a device according to the invention and/or a preferred embodiment thereof. Additionally, the device according to the invention is preferably embodied suitable to perform a method according to the invention and/or a preferred embodiment thereof.

In order to achieve the above-stated advantages, in the method according to the invention the milk is heated via the flow-heater preferably to a temperature of less than 85° C., preferably ranging from 50° C. to 85° C., further preferred ranging from 55° C. to 75° C., particularly preferred ranging from 60° C. to 70° C.

By the supply of steam in the second heating stage, in a preferred embodiment of the method according to the invention, the milk is heated to a temperature exceeding 80° C., preferably ranging from 80° C. to 95° C., further preferred ranging from 85° C. to 90° C.

By the two-stage heating process, as already mentioned, the discharge of warm and particularly hot milk is possible with a high flow-rate without any baking occurring in the flow-heater, here. Preferably in the method according to the invention the discharge of milk occurs at a flow rate of at least 0.7 l/min, preferably at least 0.8 l/min, further preferred at least 0.85 l/min.

In the device according to the invention it is provided, preferably downstream in reference to a steam supply site at which the milk/steam is added, and upstream in reference to the output of the calming line, which when used is flown through by milk heated by steam. The calming line preferably shows a length of at least 5 cm, preferably ranging from 10 cm to 30 cm, further preferred ranging from 15 cm to 20 cm.

Using the calming line an optimal thermal transfer is ensured between the milk (and/or milk froth) and steam.

In order to clean the components of the device according to the invention essentially through which the milk flows, a steam inlet is provided, preferably in a suction line between the container and the pump, which is connected in a fluid-guiding fashion to the steam generator for an optional feeding of steam into the suction line. This way, in a simpler designed embodiment an efficient cleaning can be yielded by using steam of the steam generator provided. In particular it is advantageous when in addition to the above-mentioned steam input optionally a water supply line can be connected for rinsing with water.

In order to prevent that during the cleaning process via steam and/or water any discharge occurs into the milk reservoir a valve is preferably provided in the suction line upstream (in reference to the direction of flow of milk during the conveyance) in reference to the steam inlet for an optional closure of the suction line.

The device according to the invention is particularly suited for the generation of warm and/or hot milk. In an advantageous embodiment the device is additionally embodied to generate milk froth. Devices for generating milk froth are known per se. In an advantageous embodiment an air valve is provided for an optional introduction of air, preferably upstream in reference to the flow-heater and particularly preferred at the suction side of the pump in the device according to the invention.

In this preferred embodiment it is therefore possible to optionally discharge milk or milk froth. Here, the invention particularly includes to discharge the milk optionally cold or warm and/or the milk froth optionally cold or warm.

A particularly advantageous embodiment is here yielded by using an intermittent air valve. The use of such an intermittent operable air valve is known per se and described for example in DE 10 2009 041 809 A1. This way the air supply can be regulated in an easy fashion by an appropriate clocking of the air valve and the consistency of the generated froth, particularly the size of the air pores, can be optionally pre-determined.

The method according to the invention is preferably embodied as a method for optionally producing warm milk or warm milk froth, with optionally the two-step heating process being used to create the warm milk as described above, or for creating warm milk froth, milk is conveyed from a container, mixed with air, and the milk and/or the milk/air mixture is exclusively heated via a flow-heater.

Here, the advantage results that for generating warm milk froth no steam is used and the steam generator in this case is not required to be set into operation.

In a preferred embodiment of the device according to the invention the pump comprises a controlled throttle valve, which is arranged at the pressure side of the pump, with the cross-section of flow of the throttle valve can be predetermined via control signals.

This way high variability is possible for using the pump.

On the one hand, the pump capacity can be predetermined very precisely by the throttle valve. In particular, it can be predetermined very precisely in typical pumps via a controlled throttle valve, compared to exclusively adjusting setting the pump rotation.

Furthermore, in order to produce milk froth a desired expansion for frothing can be optionally achieved downstream in reference to the throttle by the addition of air using said throttle.

In the above-mentioned preferred embodiment for an optional discharge of milk or milk froth it is particularly possible also to discharge cold milk froth. For this purpose, the flow-heater is not required. In a preferred embodiment the device according to the invention therefore comprises a bypass for an optional bypassing of the flow-heater.

As described at the outset, the device according to the invention and/or a preferred embodiment thereof may be embodied for example as an attachment device for an automatic coffee maker. Here it is advantageous for the device according to the invention to comprise a control connection to connect to the control unit of the automatic coffee maker, which control connection preferably being connected to the pump and/or a temperature sensor of the flow-heater and/or additional control components, such as a power control of the flow-heater and/or in a preferred embodiment to the above-mentioned controlled throttle valve of the pump.

In particular it is advantageous however to embody the device according to the invention as an automatic coffee maker, which coffee maker comprises at least one brewing unit to generate coffee as well as a device for heating milk as described above.

The brewing unit is here connected to an output for discharging coffee, which is preferably identical or at least adjacent to the above-mentioned output to discharge heated milk. This way it is possible easily and particularly in an automated fashion to create mixed coffee drinks. In particular in a combination of the above-mentioned preferred embodiment, in which optionally milk or milk froth can be discharged, the typical coffee/milk mixed drinks, such as cappuccino, latte macchiato, or similar drinks can be produced automatically.

The pump can here be embodied as a known milk conveyer pump. Here, typical pump embodiments are included in the scope of the invention, for example a piston pump or a peristaltic pump. However, particularly the use of a gear pump is advantageous.

The scope of the invention includes for the device according to the invention to comprise a refrigerator in which a milk container can be arranged. In particular at least one pump can be arranged in the refrigerator so that the pump and one suction line of the pump for inserting into the milk container are always inside a cooled environment.

BRIEF DESCRIPTION OF THE DRAWINGS

Additional preferred features and embodiments of the invention and the method according to the invention are explained in the following using exemplary embodiments and the figures. Shown are.

DETAILED DESCRIPTION OF THE
PREFERRED EMBODIMENTS

Figure 1:
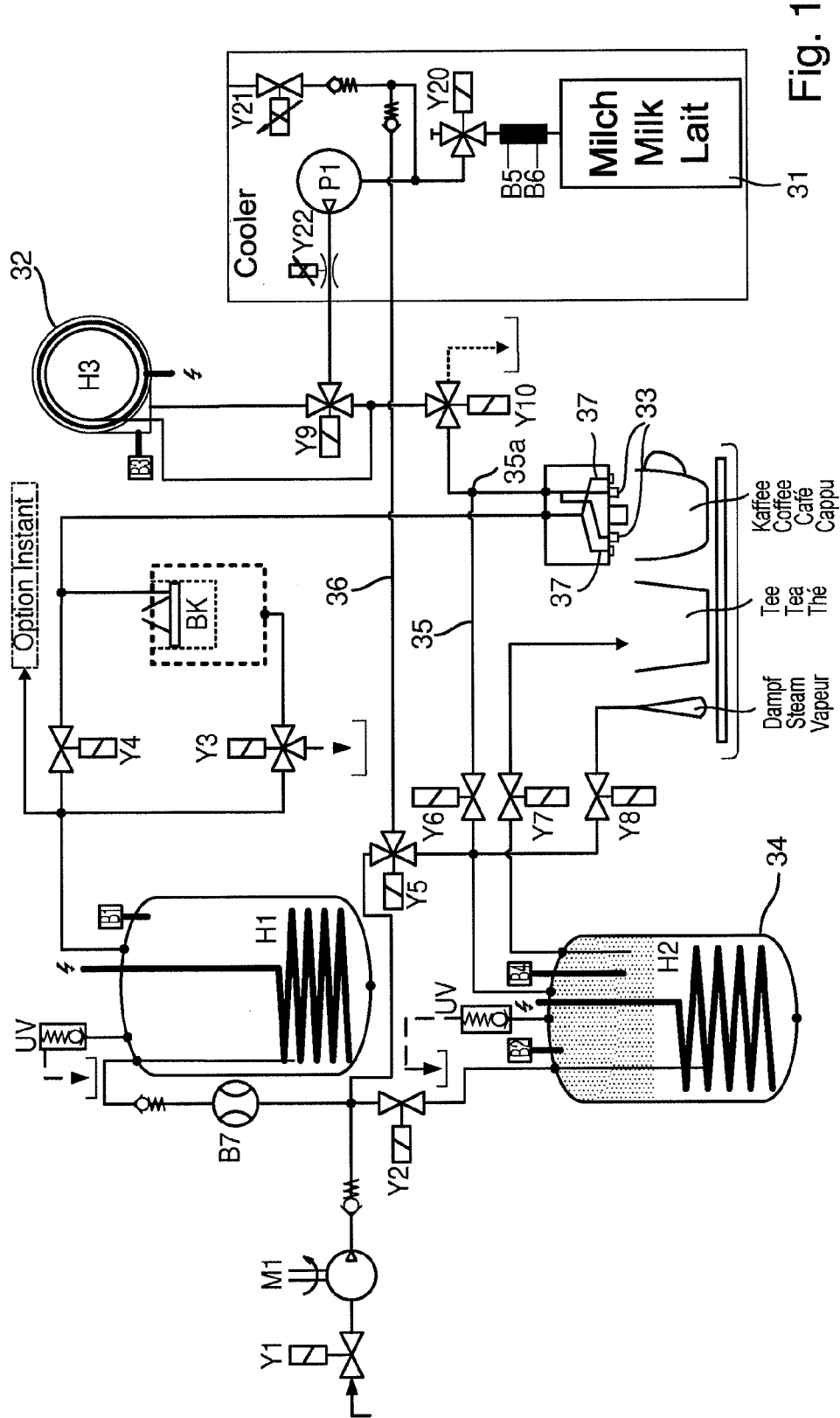
FIG. 1 is a view of a first exemplary embodiment of the device according to the invention embodied as an automatic coffee maker.

The automatic coffee maker shown in FIG. 1 comprises a device for discharging milk.

It comprises a pump P1, which at the suction side is connected via a suction line to a container 31 for milk. At the pressure side the pump P1 is connected via a two-way valve Y9 to a flow-heater 32. The output of the flow-heater 32 is connected via a drainage valve Y10, embodied as a two-way valve, to an output 33. The output comprises two openings, spaced apart from each other, so that optionally the discharge is possible into a cup and/or two cups placed side-by-side.

Thus, milk can be conveyed via the pump P1 from the container 31, heated via the flow-heater 32, and discharged from the output 33, for example into a cup.

It is essential that the device further comprises a steam generator 34 for generating water vapor.

This is connected via a steam line 35 to a milk line between the drainage valve Y10 and the output 33, with the steam line mouthing in the milk line at a steam introduction point 35a.

This way it is therefore possible that via the pump P1 milk conveyed from the container 31 is heated in a first heating stage via a flow-heater 32 and subsequently, via feeding steam from the steam generator 34 to the steam introduction point 35a, additionally heated in a second heating stage by said steam.

All components of the automatic coffee maker according to FIG. 1 are connected to a control unit, not shown. If the output of hot milk is desired, the control unit controls the components such that the milk conveyed via the pump P1 exhibits a temperature of approximately 70° C. at the output of the flow-heater 32 and is heated to a temperature of approximately 90° C. by supplying steam at the steam introduction point 35a. Here the flow rate amounts to approximately 0.8 l/min.

In order to allow precisely regulating the flow rate of the pump P1 further a throttle Y22 is provided at the pressure side of the pump between the pump P1 and the milk valve Y9. It is within the scope of the invention to control the rotations of the pump P1 in order to yield a predetermined flow rate.

It is also possible for the pump P1 to be operated at full capacity and a precise control of the conveyed amount occurring by throttling the cross-section at the pressure side of the pump to a predetermined value via the throttle Y22.

If at the beginning of the milk conveyance rinse water is still present in the milk lines it is first guided via the drainage valve Y10 into a drain and subsequently the drainage valve Y10 is switched so that the heated milk is now discharged via the output 33.

The fluid line has a length of 20 cm between the steam introduction point 35a and the output 33. This serves to calm the steam-milk mixture.

The temperature of the flow-heater 32 is monitored via a temperature sensor B3 and can thus be controlled via the control unit.

In order to discharge cold milk the pump P1 is operated with maximum capacity and the throttle Y22 is opened to its maximum cross-section. The milk valve Y9 is controlled such that the milk is directly fed to the output 33 bypassing the flow-heater 32.

The device according to the invention is additionally suitable to discharge cold or warm milk froth.

For this purpose, the device comprises an intermittent air valve Y21, which on the one side is connected to the environment and on the other side to the milk line between the container 31 and the pump P1. The connection is embodied such that in case of an open air valve Y21 and during the conveyance of milk via the pump P1, due to the Venturi effect, air is suctioned in and the conveyed milk is mixed in.

The air valve is here operated intermittent via the control unit, i.e. by a fast clocking between open and closed state the amount of air added is controlled.

This way, high-quality milk froth is created and furthermore it is possible to control the foam consistency in any arbitrary fashion.

The use of an intermittent air valve for creating milk froth is known per se and described in DE 10 2009 041 809 A1 for example.

In order to create cold milk froth the milk pump P1 is switched on at full capacity, the throttle Y22 is set to maximum cross-section, and the air valve Y21 is opened intermittently with predetermined opened and closed cycles.

Any still present rinse water is here guided at the beginning into the drain via the drainage valve Y10 and subsequently the cold milk froth is fed by an appropriate control of the milk valve Y9 to the output 33, bypassing the flow-heater 32.

In general the same process is used to create warm milk froth, however the milk valve Y9 is controlled such that the air-milk mixture is guided via the flow-heater 32 to output 33 and thus, by heating via the flow-heater 32, warm milk froth is discharged. Here, it is particularly advantageous to set the throttle Y22 to a lower than maximum cross-section because this way the consistency of the warm milk froth is improved.

In order to rinse the milk lines, the device comprises a rinse line 36 which mouths in the milk supply line between the intermittent air valve Y21 and the mouthing point of the air supply line in the milk suction line. Via a main water valve Y1, a main water pump M1, and a cleaning valve Y5, also embodied as a two-way valve, the rinse line 36 can optionally be supplied with water or steam.

It is advantageous first to rinse with cold or warm water. For the rinsing process initially the milk suction line is closed via a valve Y20, so that no rinsing medium can reach via the suction line into the container 31. Subsequently, for example water is introduced via the main water pump M1 and the rinsing line 36 into the milk line, so that water passes the pump P1, the throttle Y22, the flow-heater 32, and the drainage valve Y10 and subsequently by an appropriate control of the drainage valve Y10 is released into the drain. Subsequently the valve Y5 is controlled such that the steam generated by the steam generator 34 is inserted into the rinsing line 36 and additional cleaning occurs using steam.

The other components of the automatic coffee maker according to FIG. 1 are embodied in a manner known per se and operated in a known fashion.

The steam generator 34 comprises a heater H2, a level probe B4, and a temperature sensor B2. Water can be fed via a valve to the steam generator using the main water pump M1. These components are controlled by the control unit such that when necessary at least in the upper part of the steam generator sufficient water steam is provided. For safety reasons a pressure valve UV is provided.

As described above, steam from the steam generator 34 can be guided to the milk line for heating the milk in a second heating stage. Additionally, the discharge of steam via a valve Y8 to a steam injection lance of the automatic coffee maker is possible.

Furthermore, hot water can be discharged from the steam generator via a valve Y7 to an output, for example when tea is requested.

In order to create coffee the automatic coffee maker comprises a water boiler with a heater H1 and a temperature sensor B1 as well as, for safety reasons, also a pressure valve UV. The water boiler is also connected via the main water valve Y1 and the main water pump M1 to the main water line, with the heater H1 and the other components being controlled such that hot water for creating coffee is provided with the desired temperature. For the control a flow meter B7 is provided particularly at the cold water supply line to the boiler. The hot water from the boiler is fed via a valve Y4 to a brewing chamber BK. This brewing chamber is embodied in a manner known per se, and particularly embodied with a powder supply chamber and a grinder in a manner known per se for automatic coffee makers. Using this hot water coffee is created, which is also discharged adjacent to the output 33 to a coffee output 37, which also comprises two output openings distanced from each other.

Figure 2:
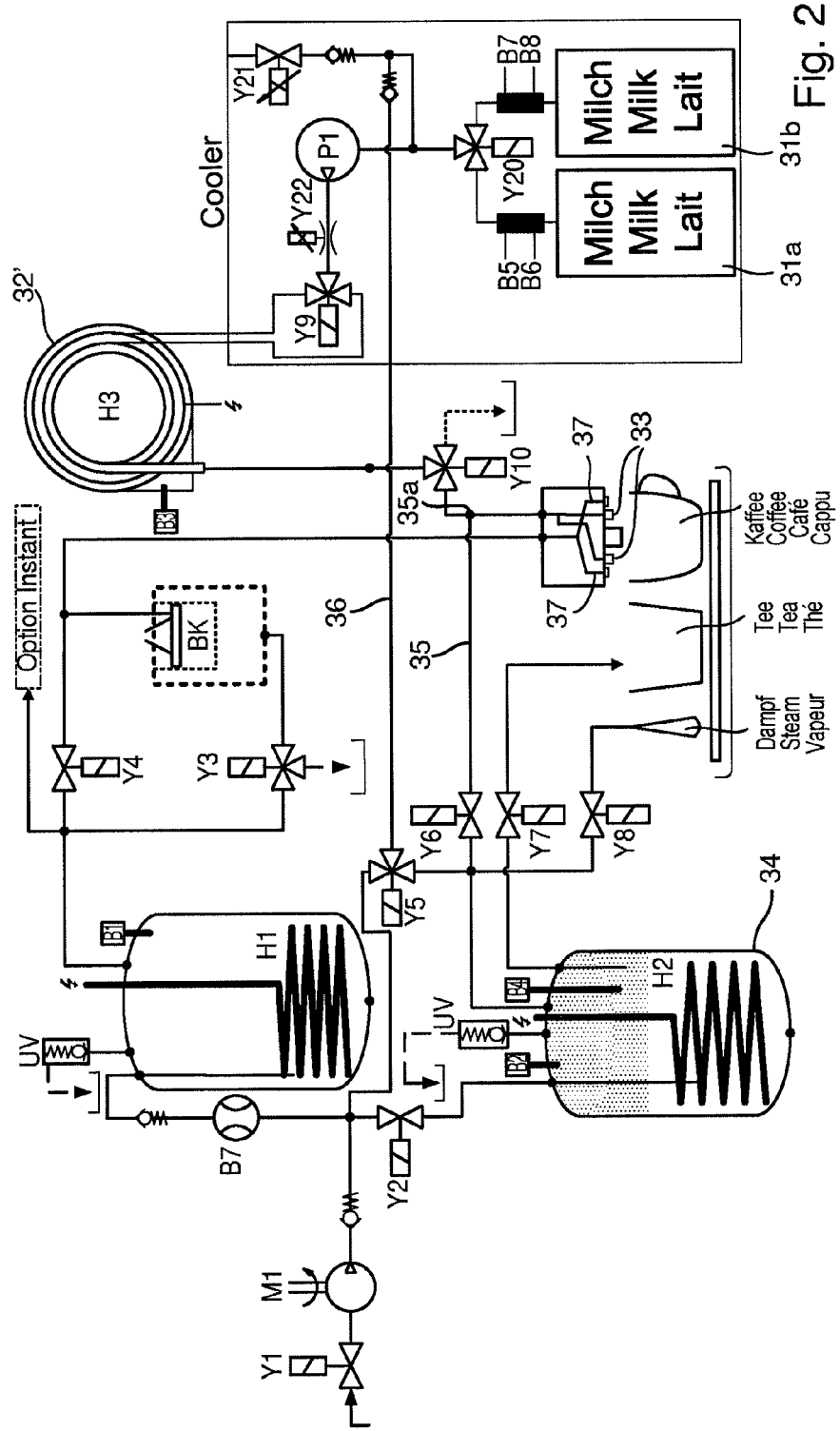
FIG. 2 is a view of a second exemplary embodiment of the device according to the invention embodied as an automatic coffee maker and a flow-heater with two parallel milk lines.

FIG. 2 shows a second exemplary embodiment also formed as an automatic coffee maker, which in its general design is identical to the first exemplary embodiment. Identical reference elements mark identical elements or elements with identical functions.

In order to avoid repetitions, in the following only the differences shall be discussed.

The automatic coffee maker according to FIG. 2 has a flow-heater 32' with two parallel lines. Via a valve Y20' a pump P1 can optionally be connected to a first or a second of the parallel lines in a fluid-conducting fashion. Furthermore, the automatic coffee maker comprises a cooling unit to accept a first milk container 31a and a second milk container 31b. Optionally one of the two containers 31a or 31b can be connected via two suction lines and a valve Y20 to a suction line of the pump P1.

The container 31a comprises cow's milk, the container 31b however lactose-free milk. Depending on the discharge desired, here milk or lactose-free milk can be heated in the flow-heater, perhaps additionally heated by the supply of steam in a second step, and discharged at an output 33. It is essential that in the flow-heater separate parallel lines are provided for cow's milk and lactose-free milk so that particularly for lactose-intolerant users it is ensured that no residue of cow's milk can reach the drink prepared with lactose-free milk via the flow heater.

In a preferred embodiment, deviating from FIG. 2, for each milk container one pump, one suction line, and one supply line for a respective line of the flow-heater are provided such that even in the flow path upstream in reference to the flow-heater the flow paths for cow's milk and lactose-free milk are completely separate.

The invention claimed is:

1. A device for discharging milk, comprising a pump (P1) to convey milk from a container (31), a flow-heater (32), and an output (33) to selectively discharge hot milk or milk foam, which cooperate with each other such that the milk conveyed via the pump (P1) and heated via the flow-heater is discharged from the output (33), and at least one steam generator (34) connected downstream in reference to the flow-heater and upstream in reference to the output to feed steam to the milk for an additional heating process to discharge hot milk, and an air valve to create milk froth, the air valve is openable to introduce environmental air upstream in reference to the pump and the flow-heater upon the at least one steam generator being deactivated for preparation and discharge of the milk froth.

2. A device according to claim 1, further comprising a control unit, which controls at least one of the pump (P1) or the flow-heater (32) such that the hot milk at the output of the flow-heater has a temperature ranging from 50° C. to 85° C.

3. A device according to claim 1, wherein downstream in reference to a steam supply site at which steam is added to the milk and upstream in reference to the output, a calming line is provided, through which milk heated by steam during operation flows, the calming line has a length of at least 5 cm.

4. A device according to claim 1, further comprising a refrigerator in which a milk container can be arranged and at least the pump (P1) also being arranged therein.

5. A device according to claim 1, wherein the pump (P1) comprises a controlled throttle valve, which is arranged at a pressure side of the pump (P1) and the controlled throttle valve has a flow-through cross-section that is pre-determined by control signals.

6. A device according to claim 1, wherein a bypass is provided between the pump (P1) and the output (33) that provides for bypassing of the flow-heater.

7. A device according to claim 1, wherein the flow-heater includes two parallel lines, with a first line adapted to heat the milk and a second line adapted to heat another liquid.

8. An automatic coffee maker comprising at least one brewing unit and a device for heating milk according to claim 1, with the brewing unit being adapted for creating coffee and at least one output (33) to discharge coffee, which is identical or adjacent to the output (33) to discharge the heated milk.

* * * * *